Figure 1:
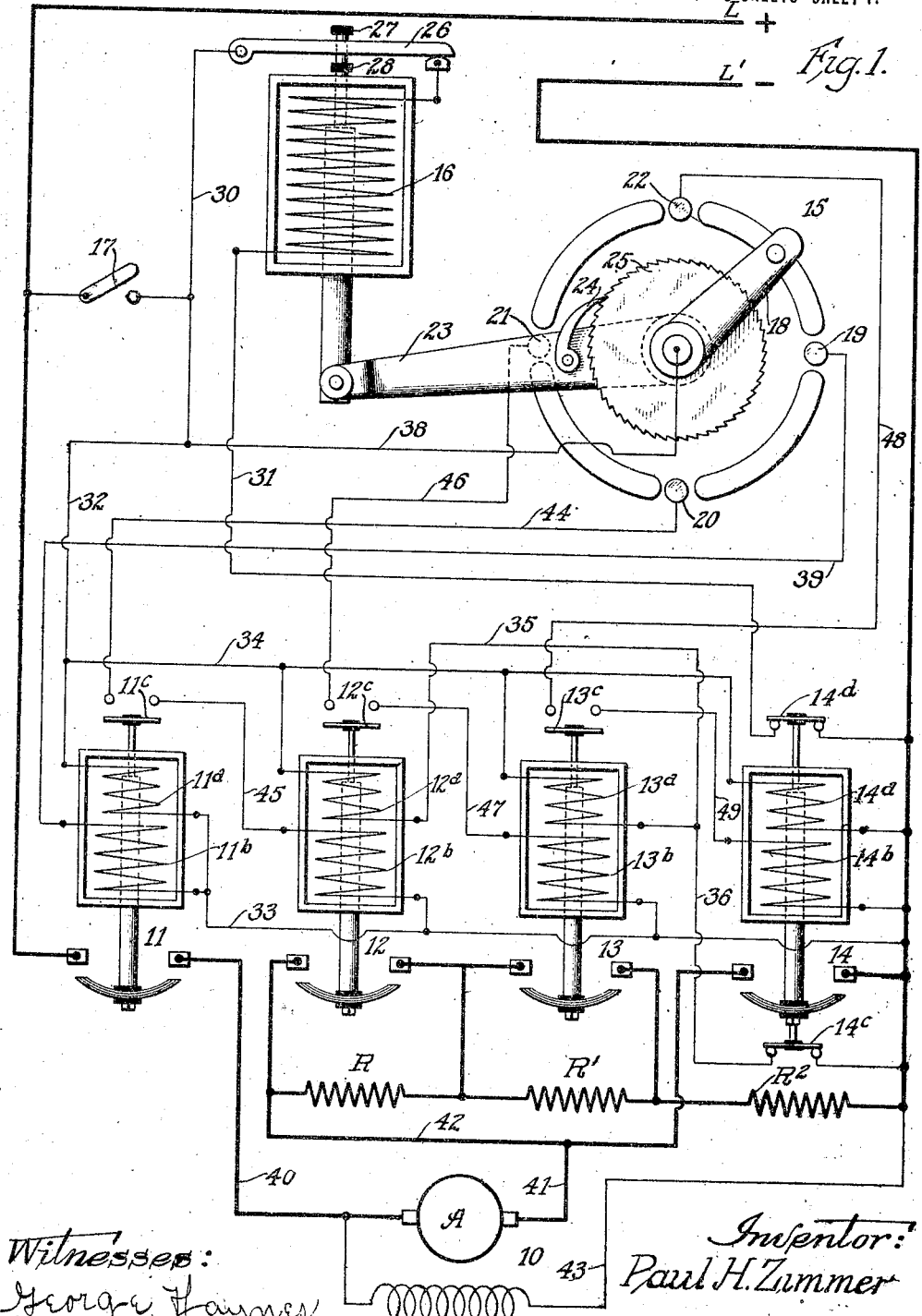

P. H. ZIMMER.
CIRCUIT CONTROLLING DEVICE.
APPLICATION FILED MAR. 10, 1913.

1,145,453.

Patented July 6, 1915.
3 SHEETS—SHEET 1.

Witnesses:
George Haynes
J. L. Johnson

Inventor:
Paul H. Zimmer
By Edwin B. Flowers Jr.
Atty.

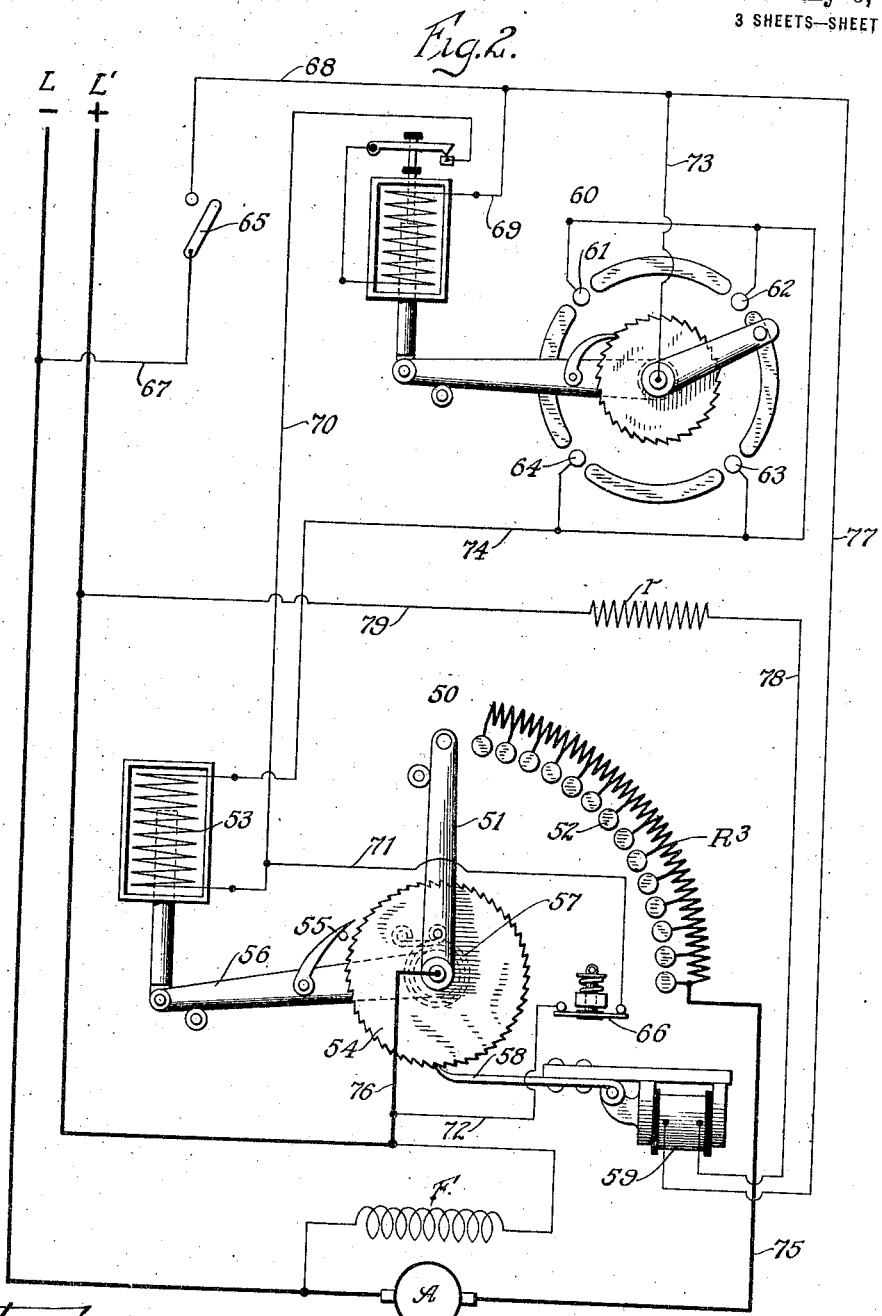

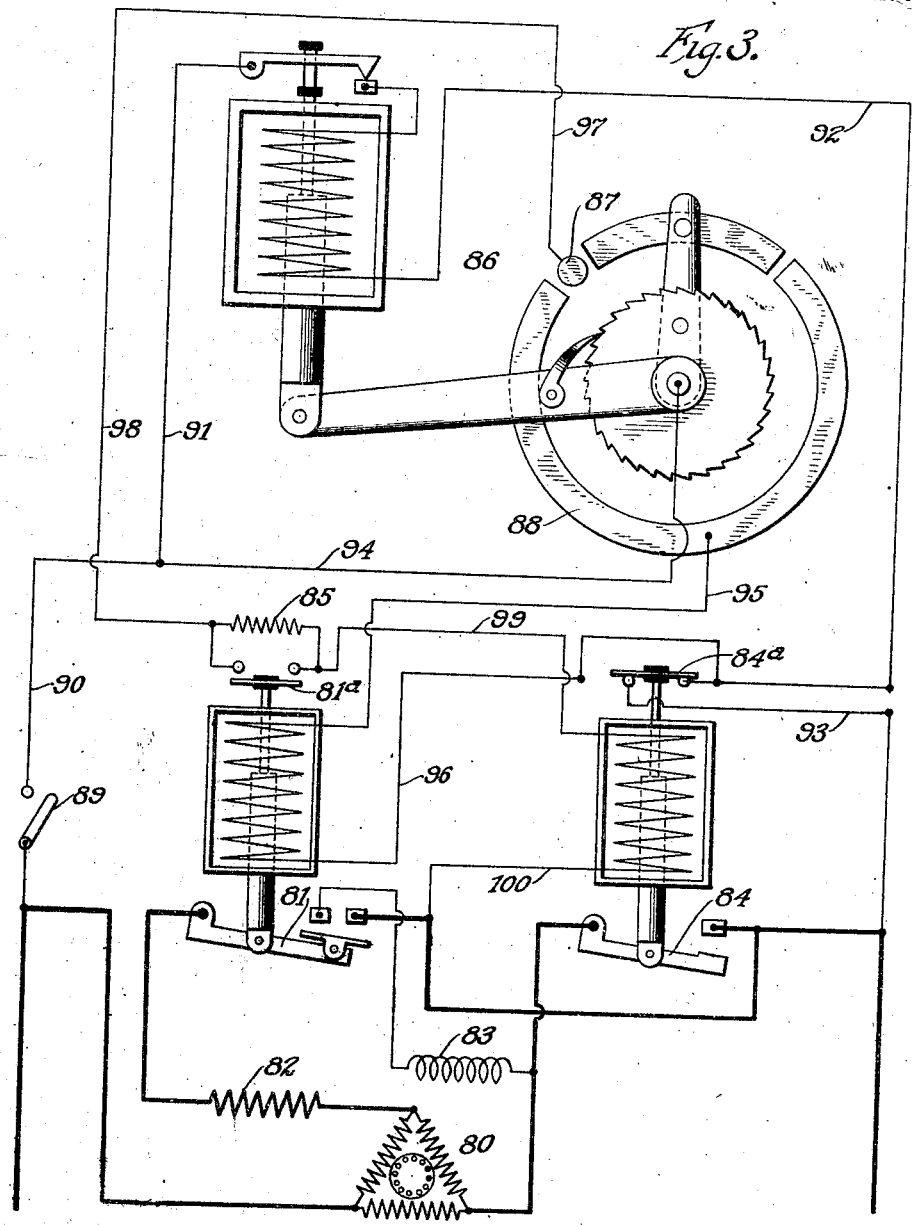

UNITED STATES PATENT OFFICE.

PAUL H. ZIMMER, OF MILWAUKEE, WISCONSIN, ASSIGNOR TO THE CUTLER-HAMMER MFG. CO., OF MILWAUKEE, WISCONSIN, A CORPORATION OF WISCONSIN.

CIRCUIT-CONTROLLING DEVICE.

1,145,453.      Specification of Letters Patent.      Patented July 6, 1915.

Application filed March 10, 1913. Serial No. 753,313.

*To all whom it may concern:*

Be it known that I, PAUL H. ZIMMER, a citizen of the United States, residing at Milwaukee, in the county of Milwaukee and State of Wisconsin, have invented new and useful Improvements in Circuit-Controlling Devices, of which the following is a full, clear, concise, and exact description, reference being had to the accompanying drawing, forming a part of this specification.

My invention relates to circuit controlling devices.

It is particularly applicable to controllers for electric motors but might be applied to other forms of circuit controllers.

One object of my invention is to provide a controller with means for insuring a definite time interval or intervals in the operation thereof.

A further object of my invention is to provide an automatic controller for successively establishing different circuits and maintaining each circuit a definite time before establishing the succeeding circuits.

A further object is to provide means which will secure the above mentioned results without requiring the use of dashpots or other similar retarding devices.

Other objects and advantages of my invention will hereinafter appear.

For the purpose of more fully and clearly disclosing the nature and advantages of my invention I shall describe the controllers illustrated in the accompanying drawings which embody my invention in several different forms.

In the drawings, Figure 1 shows diagrammatically a multiple magnet motor controller; Fig. 2 shows a ratcheted step-by-step motor controller; and, Fig. 3 shows a multiple magnet controller for an alternating current motor.

The controller shown in Fig. 1 is depicted as controlling a shunt motor 10 having an armature A and a shunt field winding F. It controls the motor through the medium of armature resistances R, R' and R². The continuity of the motor circuit is controlled by a magnetic switch 11 while the resistances R, R' and R² are controlled by magnetic switches 12, 13 and 14 respectively. The switches 11, 12, 13 and 14 are controlled by a switch 15 operated in a step-by-step manner by a solenoid 16. The solenoid 16 has a control switch 17.

For a purpose hereinafter set forth the switches 11, 12, 13 and 14 are each preferably provided with two windings, the same being given numerals corresponding to the numerals of their respective switches, with exponents "a" and "b". The switches are arranged to be closed only upon energization of both of their windings but are adapted to be maintained closed by one of said windings. The retaining windings $11^a$, $12^a$, $13^a$ and $14^a$ are, upon closure of the control switch 17, connected in parallel across the lines. The windings $12^a$ and $13^a$ are, however, disconnected from circuit by an auxiliary switch $14^c$ of the switch 14 when the latter closes, for a purpose hereinafter set forth. The switch 11 has an auxiliary switch $11^c$ in circuit with the operating winding $12^b$ of switch 12, while the switches 12 and 13 have similar auxiliary switches $12^c$ and $13^c$ respectively in circuit with the corresponding windings of their succeeding switches. The purpose of these auxiliary switches is to interlock the switches 11, 12, 13 and to necessitate operation thereof in a definite sequence. The switch 14 has a second auxiliary switch $14^d$ which is employed for deënergizing the solenoid 16 to arrest the operation of switch 15 when the switch 14 closes. The switch 15 comprises a pivoted contact arm 18 having four coöperating contacts 19, 20, 21 and 22 connected in circuit with the windings $11^b$, $12^b$, $13^b$ and $14^b$ respectively. The arm 18 is operated by the solenoid 16 through the medium of a lever 23 carrying a pawl 24 engaging with a ratchet wheel 25 fixed to said arm. This provides for a step-by-step movement of the arm 18 upon successive reciprocations of the plunger of the solenoid 16. The successive reciprocations of the solenoid plunger are obtained by intermittently energizing and deënergizing the solenoid 16 and this is accomplished by a switch 26 opened by the solenoid plunger at its upper limit of movement and closed thereby at its lower limit of movement. The switch 26, and its connection to the solenoid plunger may be of any preferred form. As illustrated, the switch is adapted to remain in any position to which it is moved until positively moved from such position and the desired positive movement is accomplished by collars 27 and 28 mounted on an extension of the solenoid plunger.

The switches 11, 12, 13 and 14 are caused to respond successively by successive engagement of the arm 18 of switch 15 with its contacts 19, 20, 21 and 22. The arm 18, however, is limited to a step-by-step movement. Thus by spacing the contacts 19, 20, 21 and 22 to require a number of steps of operation of the arm 18 in passing from each contact to the next succeeding contact definite time intervals between the closure of switches 11, 12, 13 and 14 may be obtained. Further by varying the spacing of the contacts the time intervals may be regulated as desired.

As illustrated, the contacts 19, 20, 21 and 22 are equidistantly distributed around the pivot of the arm 18 whereby the arm must move a complete revolution in order to close all of the switches and whereby equal intervals are insured between the operations of the several switches, each interval corresponding to the period of time consumed by the arm 18 in moving 90°. It is obvious, however, that by re-arrangement of the contacts 19, 20, 21 and 22 the intervals between the operation of the several switches might be varied, and furthermore varied with respect to one another.

The operation of the controller is as follows: Closure of the switch 17 completes circuit from line L to conductor 30, thence through the switch 26 and solenoid winding 16, by conductor 31 through the auxiliary switch $14^d$ of switch 14, to line L'. The solenoid 16 thereupon advances the arm 18 of switch 15 step-by-step in a clockwise direction. Closure of the switch 17 also completes a circuit from conductor 30 by conductor 32 through the winding $11^a$ of switch 11, by conductor 33 to line L'. At the same time circuit is closed from conductor 32 by conductor 34 through the winding $12^a$ of switch 12, by conductors 35 and 36 through the auxiliary switch $14^c$ of switch 14 to the opposite side of the supply circuit, and another parallel circuit from conductor 34 through the winding $13^a$ of switch 13 to conductor 36. Still further a circuit is established from conductor 34 through the winding $14^a$ of switch 14 to line L'.

When the arm 18 of switch 15 advances into engagement with contact 19 circuit is closed from line L through switch 17 to conductor 30 by conductor 38 through the arm 18 to contact 19, by conductor 39 through the winding $11^b$ to conductor 33 and thence to line L'. Both windings of the switch 11 being now energized, said switch responds and closes the motor circuit. The motor circuit may be traced from line L through switch 11 to conductor 40 through the armature and field in parallel. The former circuit extends from conductor 40 through the armature A by conductors 41 and 42 through the resistances R, R' and $R^2$ to line L'. The field circuit extends from conductor 40 through the field winding F by conductor 43 to line L'. These connections are maintained until the arm 18 has been advanced into engagement with contact 20. Thereupon circuit is established from said arm 18 to contact 20, by conductor 44 through the auxiliary contact $11^c$ of switch 11, by conductor 45 through the winding $12^b$ of switch 12 to conductor 33. When the winding $12^b$ is energized as just described, it acts cumulatively with the winding $12^a$ to close the switch 12, which short-circuits the resistance R. The winding $11^b$ of switch 11 is, in the meantime, disconnected from the circuit but the winding $11^a$ maintains the switch 11 closed.

When the arm 18 advances into engagement with contact 21 circuit is closed from said arm and said contact by conductor 46 through the auxiliary switch $12^c$ of switch 12, by conductor 47 through the winding $13^b$ of switch 13 to conductor 33. Thereupon windings $13^a$ and $13^b$ act cumulatively to close the switch 13 thereby short-circuiting the resistance R'. In the meantime winding $12^b$ is disconnected from circuit but the switch 12 is maintained closed by winding $12^a$.

When the arm 18 advances into engagement with contact 22 circuit is established from said arm and said contact by conductor 48 through the auxiliary contact $13^c$ of switch 13, by conductor 49 through the winding $14^b$ of switch 14; the windings $14^a$ and $14^b$ then acting cumulatively to close the switch 14, thereby short-circuiting resistance $R^2$ and connecting the motor directly across the lines. The switch 14 in responding opens the auxiliary switch $14^d$ thereby interrupting the circuit of the solenoid 16 and thereby checking the arm 18 of switch 15 against further operation. Also, switch 14 upon closing opens the auxiliary switch $14^e$ which interrupts the circuit of the holding windings $12^a$ and $13^a$ of switches 12 and 13, thereby causing said switches to open. The motor circuit is then maintained by switches 11 and 14.

In Fig. 2 is illustrated a step-by-step ratcheted motor controller 50 as distinguished from the multiple magnet controller in Fig. 1. This controller is also shown as controlling a variable armature resistance $R^3$ for a shunt motor having an armature A and a shunt field F. It comprises an arm 51 movable over a series of contacts 52 connected to the armature resistance, said arm when moved in a clockwise direction over said contacts gradually removing said resistance from circuit. The arm 51 is arranged to be operated by a solenoid 53 through a ratchet and pawl mechanism. This mechanism includes a ratchet wheel 54 fixed to the arm 51 and a coöperating pawl 55 mounted upon a lever 56 connected to the plunger of the solenoid 53. The arrangement is such that as the solenoid is intermittently energized and deënergized it operates the arm 51 through the ratchet and pawl mechanism to remove the resistance R³ from circuit. The arm 51 is biased in the opposite direction to reinsert the resistance R³ by a hub spring 57. Said arm is, however, adapted to be held against return movement during its step-by-step operation by means of a spring pawl 58 held in engagement with the ratchet wheel 54 by means of a magnet 59.

The solenoid 53 is arranged to be intermittently energized and deënergized by means of a solenoid operated step-by-step switch 60 of the same type and construction as the switch 15 of Fig. 1. The four contact buttons of the switch 60, which have been designated 61, 62, 63 and 64, are connected in circuit with the winding of solenoid 53 in such a manner that as the contact arm engages these buttons it will energize the solenoid 53 and then deënergize the same immediately upon disengaging said buttons. Accordingly the solenoid 53 remains inert as the contact arm of switch 60 is advanced in a step-by-step manner, by its operating solenoid, from one contact button to another, thereby insuring a definite time interval between the successive steps of operation of the motor controller 50.

The switch 60 is adapted to be set in operation by a control switch 65 and is adapted to be automatically rendered inoperative when the controller 50 has been fully operated, by a switch 66 operated by the controller arm upon reaching final position.

The circuit connections and operation of the controller shown in Fig. 2 are as follows: Assuming that control switch is closed, circuit will be established from line L by conductor 67 through switch 65, by conductors 68 and 69 through the operating solenoid of switch 60, by conductors 70 and 71 through the switch 66, by a conductor 72 to line L'. The switch 60 is thereupon set in operation and as soon as its movable contact arm engages one of the contact buttons circuit will be closed from conductor 68 by a conductor 73 through the contact arm and one of the buttons of switch 60, by a conductor 74 through the solenoid 53 to the conductor 71 and thence to the negative side of the line, as already traced. The solenoid 53 will thereupon respond, advancing the controller arm 51 into engagement with the first of the contact buttons 52. This completes the motor circuit from line L through the armature A by a conductor 75, through the resistance R³ and arm 51, by conductor 76 to line L'. The shunt field winding of the motor is connected directly across the supply lines. The motor is thus set in operation with all of the resistance R³ in circuit therewith. Also, upon closure of the control switch 65 a circuit is established from conductor 68 by conductor 77 through the retaining magnet 59 by conductor 78 through a suitable protective resistance r, by a conductor 79 to line L'. This energizes the magnet 59, which upon response, throws the pawl 58 into engagement with the ratchet wheel of the controller to hold the controller in any position to which it is moved by its operating solenoid 53. As soon as the arm of the controller 60 passes off of the contact button previously mentioned, it interrupts the circuit of the controller solenoid 53 thereby preparing the controller for a further step of operation, upon further energization of the solenoid 53. This cycle of operation is repeated at intervals as long as the control switch 60 continues to operate, whereby one step of operation is imparted to the motor controller each time the switch 60 engages one of its contact buttons. The motor controller thus operates in a step-by-step manner to gradually remove the steps of resistance R³ at definite intervals corresponding to the intervals between the engagement of successive buttons by the switch 60. When the controller 50 moves to its full extent its arm 51 opens the switch 66 which opens the circuits of the operating windings of both the switch 60 and the motor controller, thereby insuring against further operation of either.

The motor may be stopped at any time by opening the switch 65 which opens the circuit of the retaining magnet 59, whereupon the pawl 58 is released from the ratchet wheel and the spring 57 returns the controller arm to initial position.

The controller shown in Fig. 3 is illustrated as controlling an alternating current motor 80. It comprises a solenoid operated switch 81 adapted upon closure to connect the motor in circuit through a resistance 82 and a choke coil 83 for starting. It further comprises a solenoid operated switch 84 adapted upon closure to deënergize the switch 81 and connect the motor directly across the lines for running.

The switch 84 accomplishes the deënergization of the switch 81 through an auxiliary switch 84ª, the latter being opened upon closure of the former. The two switches 81 and 84 are also interlocked by means of a resistance 85 and an auxiliary switch 81ª on the switch 81 to necessitate response of the switch 81 prior to response of the switch 84.

The switches 81 and 84 are provided with a solenoid ratcheted step-by-step control switch 86 similar to the control switches heretofore described, except that instead of being provided with a plurality of contact buttons it is provided with but one button 87 and an elongated contact segment 88. The movable arm of the switch 86 when in engagement with the segment 88 energizes the switch 81 for starting and when in engagement with button 87 energizes the switch 84 for running. The segment 88 may be of any desired length in accordance with the length of the starting period desired, it being obvious that the length of this segment determines the duration of the starting period.

The circuit connections and the operation of the controller are as follows: Upon closure of the control switch 89 a circuit is established from one of the supply lines through said switch by conductors 90 and 91 through the operating solenoid switch 86, by conductor 92 through the auxiliary switch 84$^a$ of switch 84, by conductor 93 to the other supply line. The switch 86 is thus set in operation and its arm advanced in a clockwise direction until it engages segment 88. Thereupon a circuit is established from conductor 90 by a conductor 94 through the arm of switch 86 and segment 88 by a conductor 95 through the operating winding of switch 81, by a conductor 96 through the auxiliary switch 84$^a$ to the supply circuit, as already traced. Thereupon switch 81 closes, completing the motor circuit with the resistance 82 in series with a portion of its winding and the choke coil 83 in series with another portion of its winding. These connections will be maintained until the arm of switch 86 passes off the segment 88 and onto button 87. When this occurs the circuit will be established from the arm of switch 86 to button 87, by conductors 97 and 98 through the auxiliary switch 81$^a$ of switch 81, by conductor 99 through the winding of switch 84, by a conductor 100 to the supply circuit. Thereupon switch 84 responds, connecting the motor directly across the lines and, through the medium of the contact 84$^a$, deënergizing the winding of switch 81 and also the winding of switch 86. Further operation of the switch 86 is thereupon checked and the switch 81 opens, thereby interrupting the starting connection. Also, the switch 81 in opening opens its auxiliary switch 81$^a$, thereby opening the short-circuit around the resistance 85 and leaving said resistance in series with the winding of switch 84. This resistance prevents the switch 84 from again closing, should it drop out, until the switch 81 is again closed.

The motor may be stopped at any time by opening the switch 89, which opens the energizing circuit of the switch 84, causing said switch 84 to open and disconnect the motor from circuit.

What I claim as new and desire to secure by Letters Patent is:

1. In a motor controller, the combination with means for varying the motor connections, of an electro-responsive winding and a step by step device actuated by said winding and arranged to control said means, said device necessitating a plurality of responses of said winding prior to each change in the motor connections.

2. A circuit controller for successively establishing a plurality of circuits, provided with a step-by-step operated part and means necessitating a plurality of steps of movement of said part prior to the establishment of each circuit.

3. In a motor controller, in combination, electro-responsive means for varying the motor connections, and automatic means operating intermittently to control the operation of said former means, said latter means having idle operations for timing variations in the motor connections.

4. In a motor controller, in combination, electro-responsive means for varying the motor connections, and an automatic device operated in a step-by-step manner to control the operations of said means, said step-by-step device including means necessitating a number of idle steps of operation thereof as a prerequisite to certain changes in the motor connection.

5. In a motor controller, in combination, electro-responsive means for varying the motor connections, and an automatic step-by-step operated device for causing a number of different operations of said means at different points in its movement said points being spaced to necessitate a plurality of steps between adjacent points.

6. In a motor controller, in combination, electro-responsive means for varying the motor connections in a definite sequence, and a solenoid operated switch automatically controlled to operate in a step-by-step manner to control said first mentioned means to insure definite intervals between the successive variations in the motor connections, said switch having a plurality of contacts connected to said electro-responsive means and having said contacts spaced to necessitate a plurality of steps of operation in moving from one contact to the next adjacent contact.

7. In a motor controller, in combination, a plurality of electro-responsive motor controlling switches to be actuated successively, and controlling means therefor comprising an automatic device operating intermittently and operating a number of times in the interval between the operation of one of said electro-responsive switches and its next succeeding switch.

8. In a motor controller, in combination, a plurality of electro-responsive motor controlling switches to be successively energized, and an automatic step-by-step operated device for controlling said switches, said device being provided with means necessitating a number of operations of the same in the interval between the closure of one of said switches and the closure of its next succeeding switch.

9. In a motor controller, in combination, a plurality of electro-responsive motor controlling switches to be successively energized, and an automatic step-by-step operated device for controlling said switches, said device being provided with means necessitating a number of operations of the same in the interval between the closure of one of said switches and the closure of its next succeeding switch, certain of said switches upon response deënergizing other of said switches.

In witness whereof, I have hereunto subscribed my name in the presence of two witnesses.

PAUL H. ZIMMER.

Witnesses:
 FRANK H. HUBBARD,
 LEONARD H. WATSON.